United States Patent
Porikli et al.

(10) Patent No.: US 7,620,204 B2
(45) Date of Patent: Nov. 17, 2009

(54) METHOD FOR TRACKING OBJECTS IN VIDEOS USING COVARIANCE MATRICES

(75) Inventors: Fatih M. Porikli, Watertown, MA (US); Oncel Tuzel, Piscataway, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 736 days.

(21) Appl. No.: 11/352,145

(22) Filed: Feb. 9, 2006

(65) Prior Publication Data

US 2007/0183629 A1    Aug. 9, 2007

(51) Int. Cl.
G06K 9/00 (2006.01)
G06K 9/46 (2006.01)
G06K 9/66 (2006.01)

(52) U.S. Cl. .................. 382/103; 382/190; 382/191

(58) Field of Classification Search .......... 382/103, 382/104, 107, 159, 164, 165, 170, 191, 197, 382/201, 205, 206, 228
See application file for complete search history.

(56) References Cited

U.S. PATENT DOCUMENTS

| | | | |
|---|---|---|---|
| 2003/0107653 A1* | 6/2003 | Utsumi et al. | 348/207.99 |
| 2005/0129278 A1* | 6/2005 | Rui et al. | 382/103 |
| 2006/0013454 A1* | 1/2006 | Flewelling et al. | 382/128 |
| 2007/0092110 A1* | 4/2007 | Xu et al. | 382/103 |

OTHER PUBLICATIONS

Y. Boykov and D. Huttenlocher. Adaptive bayesian recognition in tracking rigid objects. In Proc. IEEE Conf. on Computer Vision and Pattern Recognition, Hilton Head, SC, vol. II, pp. 697-704, 2000.

T.-J. Cham and J. M. Rehg. A multiple hypothesis approach to figure tracking. In Proc. Perceptual User Interfaces, pp. 19-24, 1998.

D. Comaniciu, V. Ramesh, and P. Meer. Real-time tracking of non-rigid objects using mean shift. In Proc. IEEE Conf. on Computer Vision and Pattern Recognition, Hilton Head,SC, vol. 1, pp. 142-149, 2000.

P. Fletcher, C. Lu, and S. Joshi. Statistics of shape via principal geodesic analysis on lie groups. In Proc. IEEE Conf. on Computer Vision and Pattern Recognition, Madison, WI, vol. 1, pp. 95-101, 2003.

W. Forstner and B. Moonen. A metric for covariance matrices. Technical report, Dept. of Geodesy and Geoinformatics, Stuttgart University, 1999.

V. Govindu. Lie-algebraic averaging for globally consistent motion estimation. In Proc. IEEE Conf. on Computer Vision and Pattern Recognition, Washington, DC, vol. 1, pp. 684-691, 2003.

(Continued)

*Primary Examiner*—Matthew C Bella
*Assistant Examiner*—Thomas A Conway
(74) *Attorney, Agent, or Firm*—Dirk Brinkman; Gene Vinokur (57) ABSTRACT

A method is provided for tracking a non-rigid object in a sequence of frames of a video. Features of an object are extracted from the video. The features include locations of pixels and properties of the pixels. The features are used to construct a covariance matrix. The covariance matrix is used as a descriptor of the object for tracking purposes. Object deformations and appearance changes are managed with an update mechanism that is based on Lie algebra averaging.

26 Claims, 6 Drawing Sheets

OTHER PUBLICATIONS

B. Han, Y. Zhu, D. Comanicu, and L. Davis. Kernel-based bayesian filtering for object tracking. In Proc. IEEE Conf. on Computer Vision and Pattern Recognition, San Diego, CA, 2005.

M. Isard and I. Blake. Condensation—conditional density propagation for visual tracking. In Intl. J. of Computer Vision, vol. 29, pp. 5-28, 1998.

F. Porikli. Integral histogram: A fast way to extract histograms in cartesian spaces. In Proc. IEEE Conf. on Computer Vision and Pattern Recognition, San Diego, CA, 2005.

O. Tuzel, R. Subbarao, and P. Meer. Simultaneous multiple 3d motion estimation via mode finding on lie groups. In Proc. 10th Intl. Conf. on Computer Vision, Beijing, China, vol. I, pp. 18-25, 2006.

* cited by examiner

METHOD FOR TRACKING OBJECTS IN VIDEOS USING COVARIANCE MATRICES

FIELD OF THE INVENTION

This invention relates generally to computer vision, and more particularly to tracking objects in videos.

BACKGROUND OF THE INVENTION

In a sequence of frames or video, objects can be tracked by determining correspondences of object features from frame to frame. However, accurately tracking a deforming, non-rigid and fast moving object continues to be a problem.

Tracking can be performed with a mean shift operator, D. Comaniciu, V. Ramesh, and P. Meer, "Real-time tracking of non-rigid objects using mean shift," Proc. IEEE Conf. on Computer Vision and Pattern Recognition, vol. 1, pages 142-149, 2000. A nonparametric density gradient estimator is used to track an object that is most similar to a given color histogram. That method provides accurate localization. However, that method requires some overlap of the location of the object in consecutive frames, which will not be the case for fast moving objects.

Tracking can also be considered as an estimation of a state of an object, given all measurements up to a moment in time. This is equivalent to constructing a probability density function (pdf) of the object location. An optimal solution is provided by a recursive Bayesian filter, which solves the problem in successive prediction and update steps.

When the measurement noise is assumed to be Gaussian-distributed, one solution is provided by a Kalman filter, which is often used for tracking rigid objects, Y. Boykov and D. Huttenlocher, "Adaptive Bayesian recognition in tracking rigid objects," Proc. IEEE Conf. on Computer Vision and Pattern Recognition, vol. 2, pages 697-704, 2000; and R. Rosales and S. Sclarroff, "A framework for heading-guided recognition of human activity," Computer Vision and Image Understanding, vol. 91, pages 335-367, 2003. The Kalman filter is confined to predefined state transition parameters that control a 'viscosity' of motion properties.

When the state space is discrete and consists of a finite number of states, Markovian filters can be applied for object tracking. The most general class of filters is represented by particle filters, which are based on Monte Carlo integration methods. A current density of a particular state is represented by a set of random samples with associated weights. A new density is then based on the weighted samples.

Particle filters can be used to recover conditional density propagation for visual tracking and verification. Generally, particle filtering is based on random sampling, which is a problematic issue due to sample degeneracy and impoverishment, especially for high dimensional problems. A kernel-based Bayesian filter can be used for sampling a state space more effectively. A multiple hypothesis filter evaluates a probability that a moving object gave rise to a certain measurement sequence.

As a problem, all of the above filter-based methods can easily get stuck in local optima. As another concern, most prior art methods lack a competent similarity criterion that expresses both statistical and spatial properties. Most prior art methods either depend only on color distributions, or structural models.

Many different representations, from aggregated statistics to appearance models, have been used for tracking objects. Histograms are popular because normalized histograms closely resemble a probability density function of the modeled data. However, histograms do not consider spatial arrangement of the feature values. For instance, randomly rearranging pixels in an observation window yields the same histogram. Moreover, constructing higher dimensional histograms with a small number of pixels is a major problem.

Appearance models map image features, such as shape and texture, onto a uniform-sized window of tensors. Because of the exponential complexity, only a relatively small number of features can be used. Thus, each feature must be highly discriminant. The reliability of the features strictly depends on the object type. Appearance models tend to be highly sensitive to scale variations, and are also pose dependent.

Therefore, it is desired to provide a better method for tacking objects in videos.

SUMMARY OF THE INVENTION

One embodiment of the invention provides a method for tracking a non-rigid object in a sequence of frames of a video. Features of an object are extracted from the video. The features include locations of pixels and properties of the pixels. The features are used to construct a covariance matrix. The covariance matrix is used as a descriptor of the object for tracking purposes.

The covariance matrix expresses both spatial and statistical properties of the object, as well as correlations within the same representation. The covariance matrix enables efficient fusion of different types of features and modalities. The dimensionality of the covariance matrix is relatively small compared with prior art histograms.

Unlike prior art methods, no assumptions are made about the motion or location of the tracked objects. Furthermore, the method is not restrained to an estimation of a posterior probability function. Instead, the method provides a global optimal solution, and remarkably simplifies the correspondence problem.

Object deformations and appearance changes are managed with an update mechanism that is based on Lie algebra averaging.

Covariance based tracking is capable of accurately detecting non-rigid, moving objects in non-stationary camera sequences while achieving, on the average, a near perfect detection rate, even for fast moving objects.

DETAILED DESCRIPTION OF THE PREFERRED EMBODIMENT

Covariance-Based Object Tracking

Figure 1:
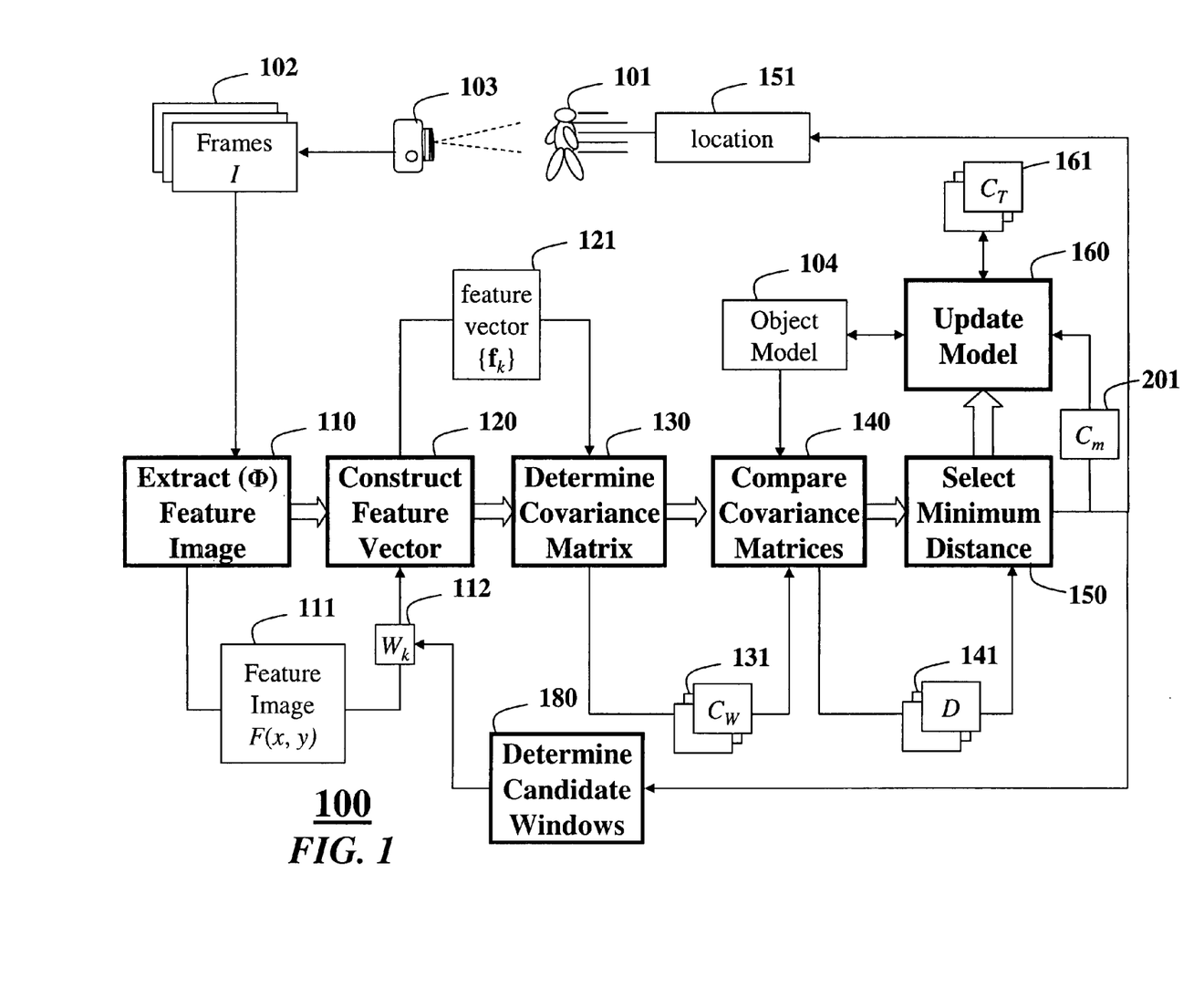
FIG. 1 is a block diagram of a method for tracking moving objects in a video according to an embodiment of the invention.

FIG. 1 shows steps of a method 100, according to one embodiment of our invention, for tracking a moving object 101 in a sequence of frames 102 or video acquired by a camera 103. The steps shown are repeated for each frame 102. We presume we have a model 104 of the object 101. The model is in the form of a covariance matrix constructed as described herein. The initial model can be obtained, for example, by localizing the object in the first frame using manual or automated object locating means. Thereafter, the model is updated 160 for each frame 102 as described herein.

For each frame 102 in the video sequence, we construct 110 a feature image 111. For various regions or windows W 112 in the feature image 111, we construct 120 a set of feature vectors 121. Corresponding covariance matrices 131 are determined 130 for the set of feature vectors 121. We compare 140 the covariance matrices 131 with the covariance matrix of the current model 104 to determine distances 141. In the current frame, we locate the region (window) that has a minimum covariance distance 201 from the covariance matrix of the model 104, and select 150 the corresponding region as the location 151 of the moving object 101. To dynamically adapt to variations in location and appearance of the moving object, we maintain a set of previous covariance matrices 161, and extract an intrinsic 'mean' covariance matrix as the updated model using Lie algebra. In the following frames, we use the previous location 151 of the object to determine 180 a set of candidate regions (windows) to construct feature vectors.

We now describe the embodiments of our invention in greater detail.

Feature Extraction

We denote I as a two-dimensional pixel image or frame 102. Each pixel has a location (x, y) and an intensity. For a color image, each pixel has three intensities (RGB). The method according to one embodiment of the invention can be generalized to other type of images, e.g., multi-spectral images.

From the image I 102, we extract 110 a M×N×d dimensional feature image 111 according to $$F(x, y)=\Phi(I, x, y),$$

where M and N are the input image dimensions and the function $\Phi$ can be any feature mapping, such as color, image gradients, edge magnitudes, edge orientation, filter responses, etc. The features can be extended to include higher order derivatives, texture scores, and temporal frame differences, e.g., motion vectors.

Next, we examine a set of windows 112 in the feature image 111. The set of windows can be selected according to the best estimate of the current location of the object, considering object appearance, size, orientation, location, speed, and direction, as determined from previous frames.

For each of the k windows $W_k$ 112, or regions, in the set, we construct 120 a d-dimensional feature vector $\{f_k\}$ 121, for k=1, ... , n. We construct 120 the feature vector $\{f_k\}$ 121 using two types of attribute mappings: spatial and appearance. The spatial attributes are obtained from the pixel coordinates (x, y), and the appearance attributes can include color, gradients, edges, filter responses, etc. The features 121 can be associated directly with the pixel coordinates:

$$f_k=[x\ y\ I(x, y)\ I_x(x, y)\ \ldots\ ]_k.$$

Alternatively, the features can be considered to be mirror symmetric with respect to axes:

$$f'_k=[|x'|\ |y'|\ I(x, y)\ I_x(x, y)\ \ldots\ ]_k,$$

where (x', y')=(x−$x_0$, y−$y_0$) are relative coordinates, and ($x_0$, $y_0$) are coordinates of a center of the window 112. It is also possible to specify the feature vector in terms of a symmetric radial relationship $$f''_k=[\|(x', y')\|\ I(x, y)\ I_x(x, y)\ \ldots\ ]_k,$$

where $$\|(x', y')\|=\sqrt{(x'^2+y'^2)}.$$

Different associations between the spatial attributes and the appearance attributes enable the imposition of different blending rules. For example, the feature vector $f_k$ prevails as an appearance model susceptible to object rotation with respect to the window origin (x', y'), whereas the radial feature vector $f''_k$ provides pose and rotation invariant spatial formations of features.

Covariance Matrix Construction

For each feature vector 121 in each window 112, we determine 130 a corresponding covariance matrix $C_W$ 131. The covariance matrix is a measure of how much two variables vary together. The covariance becomes more positive for each pair of values that differ from their mean in the same direction, and becomes more negative with each pair of values that differ from their mean in opposite directions.

Thus, we represent each window W 112 of features as a d×d covariance matrix $C_W$ 131 of the pixel features:

$$C_W = \frac{1}{MN}\sum_{k=1}^{MN}(f_k - m_\mu)(f_k - m_\mu)^T,$$

where $m_\mu$ is the vector of the means of the corresponding features for pixels within the region or window W 112, M and N are the input image dimensions, and T is a transpose operator.

According to the above definition, the covariance matrix is a symmetric matrix. The diagonal entries of the matrix represent the variance of each feature, and the non-diagonal entries represent the respective correlations of the features. The matrix $C_W$ 131 represents the covariance of multiple features within a single window or region.

There are several advantages of using covariance matrices as object models. The covariance matrix provides a natural way of fusing multiple features, without normalizing features or using blending weights. The covariance matrix embodies the same information that is embedded within prior art histograms, as well as the information that can be derived from appearance models.

A single covariance matrix is usually sufficient to compare 140 with the set of covariance matrices 131 of other windows 121 in different views and poses of the object 102. The noise corrupting individual pixel samples are largely filtered by averaging as the set of covariance matrices is determined 130. All covariance matrices have the same size (d×d).

Therefore, the matrices for different regions of different sizes can be compared directly without being restricted to a constant sized region. Indeed, the covariance matrix has an intrinsic scale invariance property over regions in different images in case the features, such as image gradients and orientations, are extracted at different scales. As expressed above, the covariance matrix can be invariant to rotations. Nevertheless, when information regarding the orientation of the pixels is embedded within the feature vector 121, it is possible to detect rotational discrepancies.

Thus, we consider the covariance matrix to be an excellent model of the moving object.

A complete description of the covariance matrix construction is given in U.S. patent application Ser. No. 11/305,427, "Method for Constructing Covariance Matrices from Data Features," filed by Porikli et al., on Dec. 14, 2005.

Figure 3:
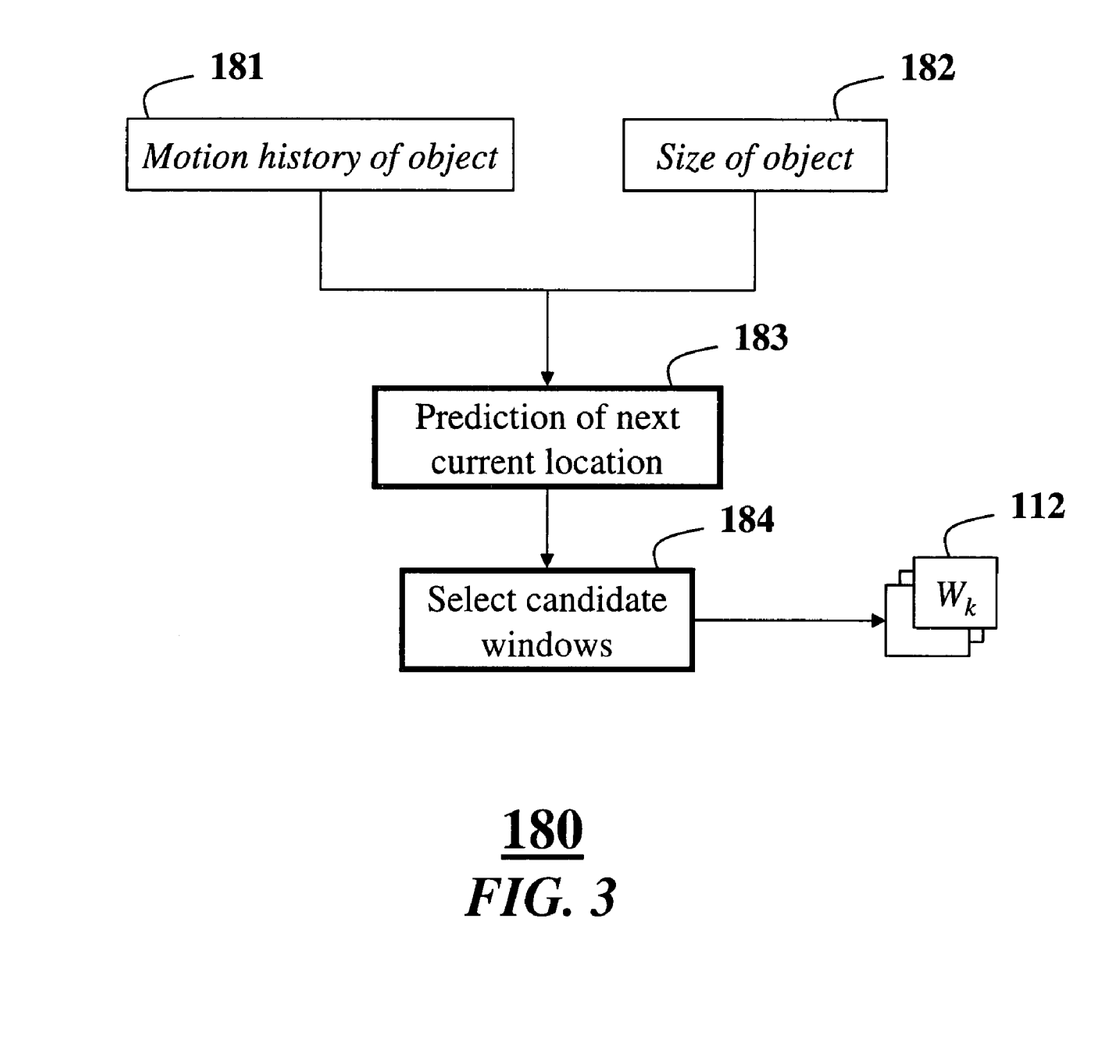
FIG. 3 is a block diagram of the selection of candidate windows according to an embodiment of the invention.

In addition to the covariance matrix, we compute a (d×1) feature-mean vector $\mu_W$ 175, see FIG. 3. Each element of this vector $\mu_W$ is the mean value of the corresponding feature in the window.

Comparing Regions

To track the moving object 101 in the frames 102, we compare 140 the set of covariance matrices 131 for various windows 112 in each frame 102 with the covariance matrix of our 'current' model 104 of the object 102 to obtain distances 141. We select 150 a minimum distance as the current location 151 of the object 101. The model's covariance matrix 104 can be updated 160 for each frame as the object is tracked, as described below.

To obtain a most similar region in the current frame for the moving object 101, we measure 140 'distances' 141 between the set of covariance matrices 131 from the current frame and the object model covariance matrix 104.

However, the covariance matrices do not lie in Euclidean space. For example, the space is not closed under multiplication with negative scalers. That is, a simple arithmetic subtraction of two covariance matrices does not measure a discrepancy in the corresponding regions.

The covariance matrices are either positive definite or positive semi-definite. If features in the feature vector are exactly identical, which is to say that the covariance matrices are symmetric positive definite, then it is possible to apply a distance measure described by Forstner et al., "A metric for covariance matrices," Technical report, Dept. of Geodesy and Geoinformatics, Stuttgart University, 1999, incorporated herein by reference. That metric uses a sum of squared logarithms of eigenvalues to determine a dissimilarity or 'distance' 141 between covariance matrices as $$D(C_i, C_j) = \sqrt{\sum_{k=1}^{d} \ln^2 \lambda_k(C_i, C_j)},$$

where $\{\lambda_k(C_i, C_j)\}$ are generalized eigenvalues of matrices $C_i$ and $C_j$, and are determined from $$\lambda_k C_i x_k - C_j x_k = 0 \ k=1\ldots d,$$

where $x_k$ are the generalized eigenvectors. The logarithm guarantees that deviations are measured as factors, and the squaring guarantees that deviation factors are evaluated equally.

The distance measures D 141 satisfy the metric axioms for positive definite symmetric matrices $C_i$ and $C_j$. In addition, the covariance is invariant to mean changes, such as identical scaling of color values. This becomes an advantageous property when objects are tracked under varying illumination conditions. Changes in appearance due to carrying illumination can be detected by including the mean distances, in addition to the covariance distance.

Figure 2:
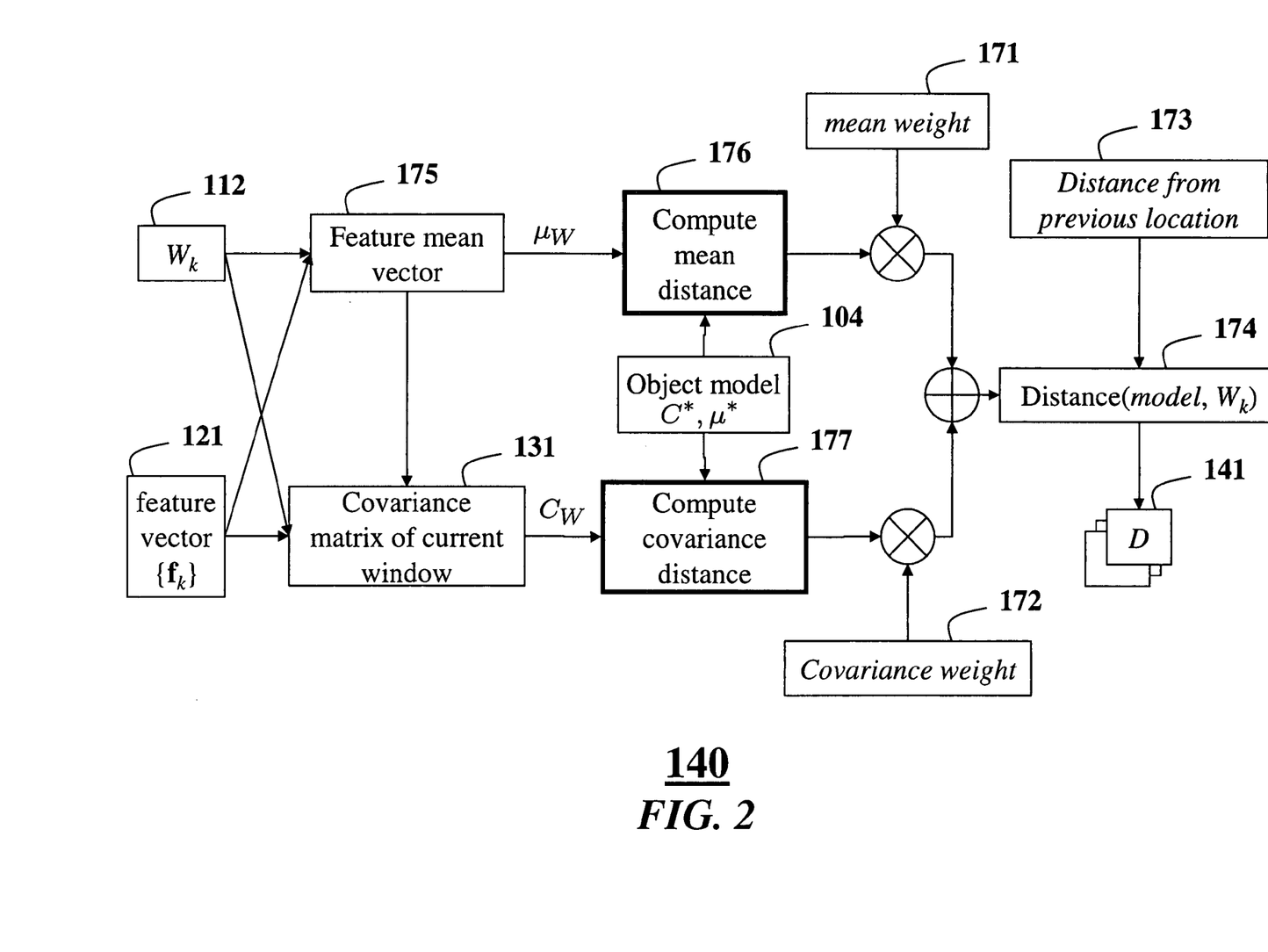
FIG. 2 is a block diagram of the determination of distances according to an embodiment of the invention.

FIG. 2 shows the steps for comparing 140 the covariance matrices to determine the distance measures D according to an embodiment of the invention. In addition to the covariance matrix comparison, we compute 176 a distance between the feature-mean vectors of the model and candidate regions. This distance is defined as the norm of the mean feature vector differences $\|\mu_W - \mu^*\|$ between the model 104 and current window.

Both covariance distance 177 and mean distance 176 between the model and current window are scaled with fusion weights to impose application specific constraints on the distance function. These weights 171 and 172 adjust how much importance should be given to covariance and how sensitive the distance function should be towards the mean differences such as color and illumination changes. After we multiply the covariance distance 177 by the covariance fusion weight 172 and the feature-mean distance 176 by the mean fusion weight 171, we assign their sum as the distance between the model and current window 174. This distance score also considers the spatial distance of the current window from the previous location of the object 173. With respect to the spatial distance 173, the model-to-current window distance score 174 increases proportionally. This enables us to impose motion specific constraints on the estimated locations. In applications such that motion of the object should not be limited, the spatial distance is not included in the distance term 174.

Additional motion based constraints are integrated in the candidate window selection 180, shown in FIG. 3. Using the motion history 181 of the object, that is, the set of previous locations of the object, and the sizes of the object 182, the search range is limited. For specific applications where the object's motion is constrained to fit into a linear or non-linear motion model, we predict 183 the location of the object in the current frame using Kalman filtering based methods. We define 184 a search region around this predicted location according to the size of the object. For instance, the search region can be a window that is twice as large as the object. Then, the feature extraction, covariance comparison, and distance computation are applied for the candidate windows 112 only in the search region.

For applications where the motion is not constrained, the search region is the entire image.

Model Update Strategies

Because non-rigid and moving objects undergo transformations in shape, size, and appearance over time, it is possible to adapt 160 to these variations dynamically. However, it should be understood that if the appearance of the object, for example, a ball or vehicle, remains relatively stable, the update 160 step is not always necessary.

We construct and update a subset of covariance matrices 161 corresponding to recently estimated object regions $W_1, \ldots, W_T$. We retain the subset of T previous covariance matrices $[C_1, \ldots, C_T]$, where $C_1$ denotes the current covariance matrix. From this subset, we determine a sample mean covariance matrix. The sample mean covariance matrix 'blends' all the previous matrices to resemble the properties of the object 101.

When all the previously detected regions and the corresponding feature measurements are available, an aggregated covariance matrix 104 can be obtained by $$\hat{C} = \begin{bmatrix} \sigma_{1,1}^2 & \sigma_{1,2}^2 & \cdots \\ \sigma_{1,2}^2 & \sigma_{2,2}^2 & \\ \vdots & & \ddots \end{bmatrix}_{d \times d},$$

where the cross-covariances are defined as $$\sigma_{u,v}^2 = \frac{1}{MNT} \sum_{t=1}^{T} \sum_{k=1}^{MN} [f_k^t(u) - m_\mu(u)][f_k^t(v) - m_\mu(v)]$$

and $f_k^t \in W_T$.

The means $m_\mu$ are determined over all regions $W_1, \ldots, W_T$. This formulation assumes that all the windows have identical sizes and are equally influential.

However, it is desirable to obtain the aggregated covariance matrix without being limited to a constant window size and having to keep all previous measurements.

We want to determine a mean covariance matrix, i.e., an intrinsic average. However, covariance matrices do not conform to Euclidean geometry, and as a result, taking the average of matrices can be inaccurate. Still, we can determine the mean of multiple covariance matrices using Riemannian geometry, because positive definite covariance matrices have the Lie group structure.

We provide a brief overview of the Lie group and algebra. A group is a non-empty set G with a group operation that has the following properties for all A, B, C ∈ G:

Closure: AB ∈ G
Associativity: (AB)C=A(BC)
Identity: e ∈ G, such that Ae=eA=A
Inverses: $A^{-1}$ ∈ G, such that $AA^{-1}=A^{-1}A=e$.

A Lie group is an analytic manifold that is also a group, such that the group operation's multiplication (A,B) ↦AB: G×G ↦G, and inversion A ↦$A^{-1}$: G ↦G are differentiable maps. Lie groups can be locally viewed as topologically equivalent to the vector space, $\Re^d$. Thus, a local neighborhood of any group element G can be adequately described by its tangent space. The tangent space at the identity element of the group e forms a Lie algebra g. The Lie algebra g is a vector space that is closed g×g ↦g under the Lie bracket, which is a bilinear operation that satisfies the following identities:

Anti-symmetry: [a, b]=−[b, a], and
Jacobi identity: [a, [b, c]]+[b, [c, a]]+[c, [a, b]]=0.

An exponential map, exp: g ↦G, maps the vectors in the Lie algebra to the Lie group. For our purposes, we focus on the matrix Lie groups. The exponential map of a matrix and its inverse is defined by $$\exp(a) = \sum_{n=0}^{\infty} \frac{1}{n!} a^n, \quad \log(A) = \sum_{n=1}^{\infty} \frac{(-1)^{n-1}}{n} (A - e)^n.$$

For commutative groups, the exponential map satisfies the identity exp(a)exp(b)=exp(a+b). This identity does not hold for non-commutative Lie groups, such as covariance matrices. An equivalent mapping is defined by μ: g×g ↦g, i.e., exp(a)exp(b)=exp(μ(a, b)). The mapping μ( . . . , . . . ) is defined by the Baker-Campbell-Hausdorff formula as $$\mu(a, b) = a + b + \frac{1}{2}[a, b] + O(|(a, b)|^3). \quad (1)$$

We use the Lie algebra to obtain the intrinsic mean of the set of covariance matrices 161. Let c be an element on the Lie algebra, and C=exp(c) be the mapping of the element to the Lie group, i.e., the corresponding covariance matrix. Distances on the manifolds are defined in terms of minimum length curves between points on the manifold. The curve with the minimum length is called the geodesic, and the length of the curve is the intrinsic distance.

The intrinsic distance of point C to the identity element of the group e is given by $\|\log(C)\|$. Left multiplication by an inverse of a group element $C^{-1}$ maps the point C to e, and the tangent space at C to Lie algebra. This mapping is an isomorphism. Using this mapping, we can measure the intrinsic distance between any two group elements as $$\rho(C_i, C_j) = \|\log(C_i^{-1} C_j)\|. \quad (2)$$

Given the covariance matrices, 161, $\{C_t\}_{t=1 \ldots T}$, as data points on the group, the mapping $$c_t = \log(C^{-1} C_t) \quad (3)$$

transforms the data points to the Lie algebra and C to zero.

Because the Lie algebra is a vector space, we determine a first order approximation to the true or intrinsic mean on this space. Starting at an initial matrix $C_1$, and determining a first order approximation to the intrinsic mean iteratively, we converge to a fixed point on the group. The process is     initialize C=$C_1$
    repeat
        for t=1 to T
            compute $c_t = \log(\hat{C}^{-1} C_t)$
        compute $$\Delta \hat{C} = \exp\left(\frac{1}{T} \sum_{t=1}^{T} c_t\right)$$

assign $\hat{C} = \hat{C} \Delta \hat{C}$
    until $\|\log(\Delta \hat{C})\| < \epsilon$ At the end of the iterations, we find the intrinsic mean $\hat{C}$. We use the intrinsic mean covariance matrix $\hat{C}$ as the current model 104.

When we estimate the object location in the following frame, we compare the covariance matrices 131 of the various regions with the covariance matrix of the model 104.

In the above formulations, we considered the subset of previous matrices $C_1 \ldots C_T$ as equally influential on the result, regardless of whether the results are accurate or not.

It is possible to weight the Lie algebra data points proportionally according to the Lie group matrices similarity to the previous model. Then, the second 'compute' step of the above process becomes $$\Delta \hat{C} = \exp\left(\frac{1}{\rho^*} \sum_{t=1}^{T} \rho(C_t, C^*) c_t\right) \quad (4)$$

where $$\rho^* = \sum_{t=1}^{T} \rho(C_t, C^*)$$

and C* is the model determined for the previous frame.

Figure 4:
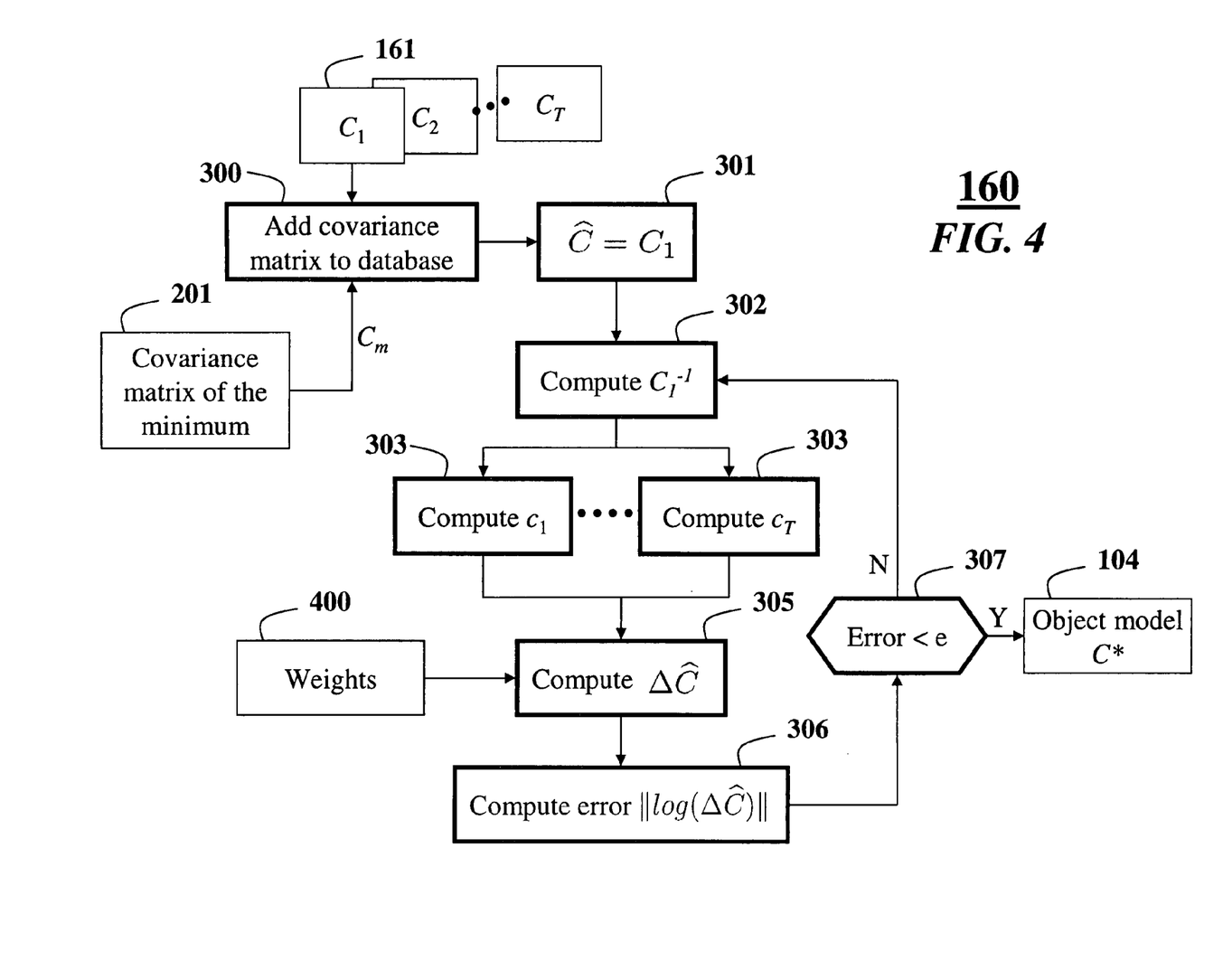
FIG. 4 is a block diagram of the updating of the object model according to an embodiment of the invention.

In other words, we update the object model C* 104 using a given covariance matrix corresponding to the minimum distance $C_m$ 201. Referring to FIG. 4, we first add 300 the matrix $C_m$ 201 into the matrix dataset of previous covariance matrices $[C_1, \ldots, C_T]$ 161. Then we assign 301 the first matrix in the database as the temporary intrinsic mean covariance matrix $\hat{C}$. We compute its inverse 302. We compute 303 the mappings $c_t$ where t=1, ..., T by the logarithm of the corresponding covariance matrices multiplied by the matrix inverse as shown in the above process. We compute 305 a weighted summation of these mappings using weight coefficients 400. We compute 306 an error term and compare 307 it with an error threshold e. If the error term is larger than the threshold then we continue to 302 by assigning inverse from the temporary intrinsic mean. If error is small, we assign the temporary intrinsic mean covariance matrix $\hat{C}$ as the new updated model C* 104.

Figure 5:
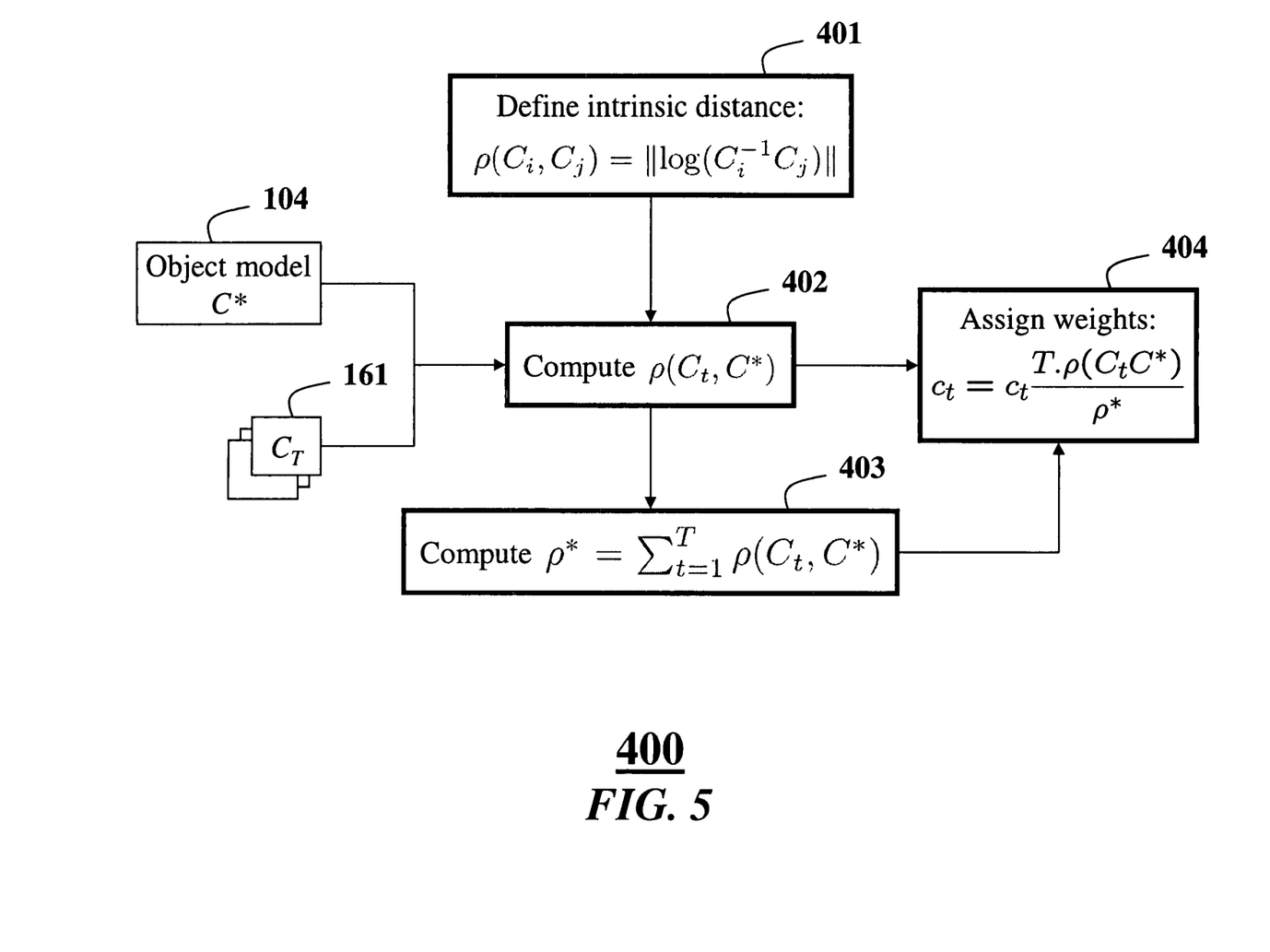
FIG. 5 is a block diagram of the assignment of weights for the object model updating according to an embodiment of the invention.

To assign the above weights 400 as shown in FIG. 5, we define an intrinsic distance function 401 and compute individual distance terms 402 and a total distance 403. Then we assign weights 400 according to formula shown in 404.

Figure 6:
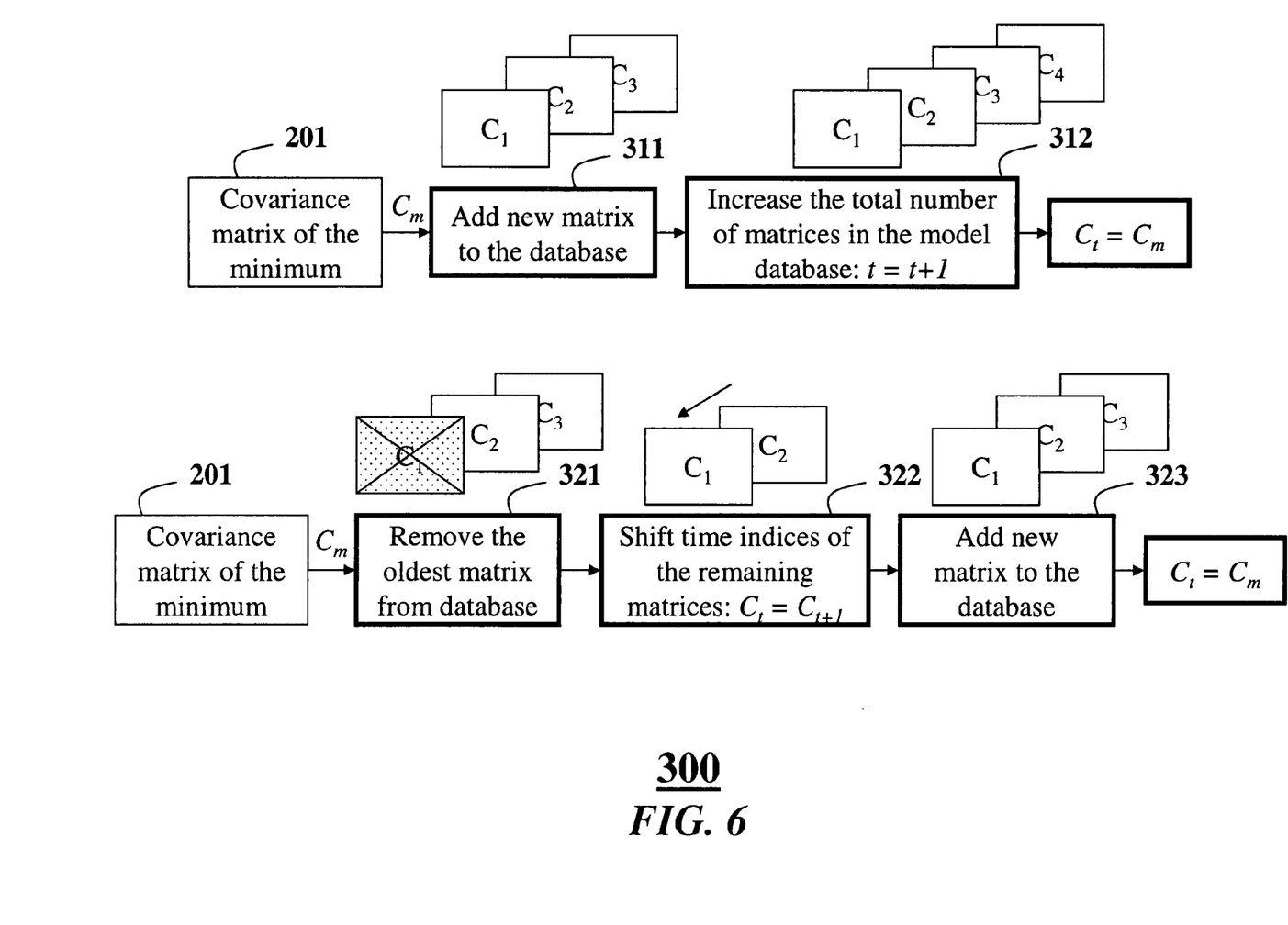
FIG. 6 is a block diagram of two methods for adding a matrix corresponding to the minimum distance into a dataset of previous covariance matrices according to embodiments of the invention.

As shown in FIG. 6, there are different methods to add 300 the current matrix corresponding to the minimum distance into dataset of previous covariance matrices. We directly add the current matrix a new matrix to the dataset 311 and increment the number of matrices 312. Alternatively, we remove 321 the oldest matrix added to the dataset. We update the indices 322. These indices indicate the time matrices added into dataset. Then as the most recent component, we add the current matrix 323.

EFFECT OF THE INVENTION

The method for tracking an object in a video according to embodiments of the invention employs both spatial and appearance attributes of objects, and provides an elegant solution to fuse multiple object features.

The method does not make any assumption on the appearance and motion of the object. The method is not limited to a maximum speed. This means that the method can track objects even if their motion is erratic and fast. The method does not assume overlap between object regions between consecutive frames, in contrast to the prior art mean-shift method.

The method finds a global optimum solution, unlike the prior art local sampling methods, such as particle filtering. The method can effectively adapt to temporal model changes, and has a very low-dimensionality of $(d^2+d)/2$. The method can also compare object regions of varying sizes, which is useful if the perceived size of the object is changes as viewed by the camera.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computerized method for tracking an object in a sequence of frames, comprising a processor for performing step of the method, comprising the steps of:
    extracting a feature frame from each frame in a sequence of frames acquired of an object;
    constructing a set of feature vectors for each feature frame, each feature vector corresponding to a different window of features in the feature frame;
    determining a corresponding set of covariance matrices from the set feature vectors;
    measuring distances between each covariance matrix in the set of covariance matrices and a model covariance matrix representing the object; and
    selecting a particular window as a location of the object in the frame, the particular window having a corresponding covariance matrix with a minimum distance from the model covariance matrix.

2. The method of claim 1, further comprising:
    updating, for each frame, the model covariance matrix.

3. The method of claim 1, in which the frames are multi-spectral images.

4. The method of claim 1, in which the different windows are selected according to an estimate of the location of the object in the frame.

5. The method of claim 1, in which each feature vector includes spatial attributes and appearance attributes of the object.

6. The method of claim 5, in which the spatial attributes are obtained from pixel coordinates in the feature image, and the appearance attributes include pixel intensities.

7. The method of claim 1, in which a covariance matrix $C_W$ for a particular window W is $$C_W = \frac{1}{MN} \sum_{k=1}^{MN} (f_k - m_\mu)(f_k - m_\mu)^T,$$

where $m_\mu$ is a vector of means of a corresponding feature vector $f_k$, M and N are window sizes, and T is a transpose operator.

8. The method of claim 1, in which the different windows have different sizes and locations in the feature image.

9. The method of claim 1, in which a distance between two matrices $C_i$ and $C_j$ is $$D(C_i, C_j) = \sqrt{\sum_{k=1}^{d} \ln^2 \lambda_k(C_i, C_j)},$$

where $\{\lambda_k(C_i, C_j)\}$ are generalized eigenvalues of the matrices $C_i$ and $C_j$, determined from $$\lambda_k C_i \chi_k - C_j \chi_k = 0 \ k=1 \ldots d,$$

for d eigenvalues corresponding to d features.

10. The method of claim 2, in which the updating uses a subset of the set of covariance matrices to determine an intrinsic mean covariance matrix as the model covariance matrix.

11. The method of claim 10, in which the mean covariance matrix is determined using Lie algebra.

12. The method of claim 10, further comprising:
    multiplying each covariance matrix distance by a weight in the subset according to their distances from the model covariance matrix.

13. The method of claim 10, further comprising:
assigning constant weight values to each covariance matrix in the subset.

14. The method of claim 10, further comprising:
assigning higher weight values to the most recent covariance matrices in the subset.

15. The method of claim 10, further comprising:
including the current model covariance matrix in the subset; and
incrementing the number of covariance matrices in the subset.

16. The method of claim 10, further comprising:
removing the oldest covariance matrix from the subset;
including the current model covariance matrix in the subset to keep the total number of matrices constant.

17. The method of claim 10, further comprising:
keeping a subset of the previous object locations and corresponding features within the windows; and
computing the model covariance matrix directly from the features.

18. The method of claim 1, further comprising:
updating, for each frame, a model feature mean vector.

19. The method of claim 18, further comprising:
measuring distances between the model feature mean vector and window feature mean vectors to compute a feature mean distance;
multiplying the covariance distance by a covariance fusion weight;
multiplying the mean distance by a covariance fusion weight;
computing a weighted sum of the covariance and feature mean distances;
assigning the weighted sum as the distance between model and current window; and
selecting a particular window as a location of the object in the search region, the particular window having a minimum weighted sum.

20. The method of claim 6, in which the spatial attributes are the spatial coordinate values of pixels.

21. The method of claim 6, in which the spatial attributes are the distance of the pixel from an origin point in the window.

22. The method of claim 6, in which the spatial attributes are the absolute value of the spatial coordinate values of pixels with respect to an origin in the window.

23. The method of claim 1, further comprising:
predicting a search region in the current image from the previous locations of the object locations;
constructing a set of feature vectors in the search region;
determining a corresponding set of covariance matrices from the set feature vectors in the search region;
measuring distances between each covariance matrices in the set and a model covariance matrix representing the object in the search region; and
selecting a particular window as a location of the object in the search region, the particular window having a corresponding covariance matrix with a minimum distance from the model covariance matrix.

24. The method of claim 1, further comprising:
representing each window by the set of eigenvalues of its covariance matrix.

25. The method of claim 24, further comprising:
determining a corresponding set of eigenvalues from the set feature vectors;
measuring distances between each set of eigenvalues in the set and a model set of eigenvalues representing the object; and
selecting a particular window as a location of the object in the frame, the particular window having a corresponding set of eigenvalues with a minimum distance from the model set of eigenvalues.

26. The method of claim 25, further comprising:
updating, for each frame, a set of model eigenvalues.

* * * * *